June 26, 1962

L. A. WILKINSON 3,041,034

ADJUSTABLE SUPPORT ARM

Filed Aug. 12, 1961

INVENTOR.
LEONARD A. WILKINSON
BY
Bean, Brooks, Buckley & Bean
ATTORNEY

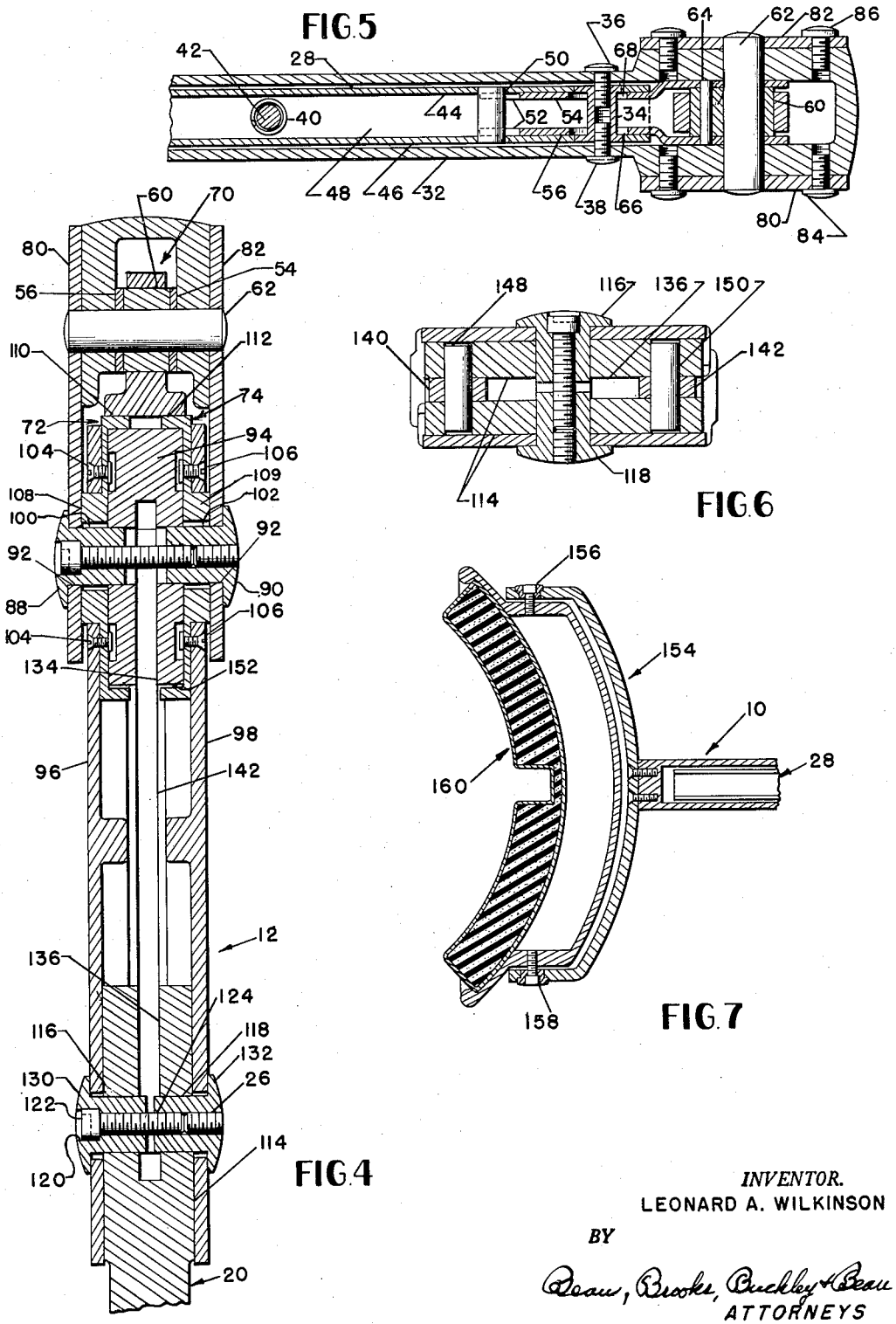
June 26, 1962 L. A. WILKINSON 3,041,034
ADJUSTABLE SUPPORT ARM
Filed Aug. 12, 1961 2 Sheets-Sheet 2
INVENTOR.
LEONARD A. WILKINSON
BY
Dean, Brooke, Buckley + Dean
ATTORNEYS United States Patent Office 3,041,034
Patented June 26, 1962

3,041,034
ADJUSTABLE SUPPORT ARM
Leonard A. Wilkinson, Snyder, N.Y., assignor to American Optical Company, Southbridge, Mass.
Filed Apr. 12, 1961, Ser. No. 102,493
13 Claims. (Cl. 248—284)

This invention relates to mechanical linkages in general and pertains more particularly to a mechanical linkage and compound brake therefor and, with further particularity, pertains to a linkage system for supporting such devices as lamps, head rests, mirrors, etc. in such manner that the supported device may be adjusted or maneuvered into a desired position by one hand of the operator which simultaneously releases the compound braking mechanism permitting of such adjustment.

In many instances, it is desirable to support a device such as a lamp or the like for movement into any one of a plurality of positions by means of a linkage system which readily permits such adjustment or movement but which at the same time is capable of rigidly holding the device when its position is once established. It is also desirable to achieve these results without the necessity for unusual effort on the operator's part and to permit of the requisite adjustment by one hand manipulation leaving the other hand free for other purposes. It is therefore of primary concern in connection with the present invention to provide a linkage system and compound brake utilized in conjunction therewith, which will achieve the above desirable objectives and wherein the same is accomplished with a minimum number of component parts.

More specifically, the present invention contemplates a linkage system for supporting objects such as may be desired in which the linkage system incorporates at least two relatively movable components and wherein the interconnection between these two components incorporates a compound braking mechanism which rigidifies both components simultaneously upon actuation of a single brake controlling member.

Another object of this invention is to provide a linkage system including a pair of pivotally interconnecting linkage components, one of which at least is further mounted for pivotal movement on another element and wherein the pivotal interconnection between the two components is characterized by a controlled degree of lost motion in response to which a compound braking action, simultaneously arresting pivotal motion of both of the components, is achieved.

A further object of this invention is to provide a novel type of linkage system and associated compound brake means therefor including a pair of pivotally interconnected links whose pivotal interconnection is characterized also by the provision for a limited amount of lost motion therebetween and wherein one of the members carries a brake shoe element engageable with a brake member concentrically disposed relative to the pivotal axis between the two components and wherein there is also provided an internal brake shoe member relatively movable with respect to the brake element in response to pivotal motion of the member by which it is carried and wherein the limited lost motion pivotal interconnection permits of the application of the internal brake component in response to the application, manually controlled, of the external brake component as occasioned by the first mentioned brake shoe.

Other objects and advantages of the invention will appear from the detailed description hereinafter and the accompanying drawings wherein:

FIG. 4 is an enlarged vertical section taken substantially along the plane of section line IV—IV of FIG. 1 and illustrating details of the internal construction of the lower pivot member and also of the brake mechanism and pivotal connection between the two link components of the system;

FIG. 5 is an enlarged horizontal section taken substantially along the plane of section line V—V of FIG. 1 and showing details of the brake release mechanism;

FIG. 6 is an enlarged section taken substantially along the plane of section line VI—VI of FIG. 1 and illustrating details of the lower pivotal connection for the lower link component of this system; and FIG. 7 is an enlarged horizontal section taken substantially along the plane of section line VII—VII of FIG. 1, showing details of the head rest.

Figure 1:
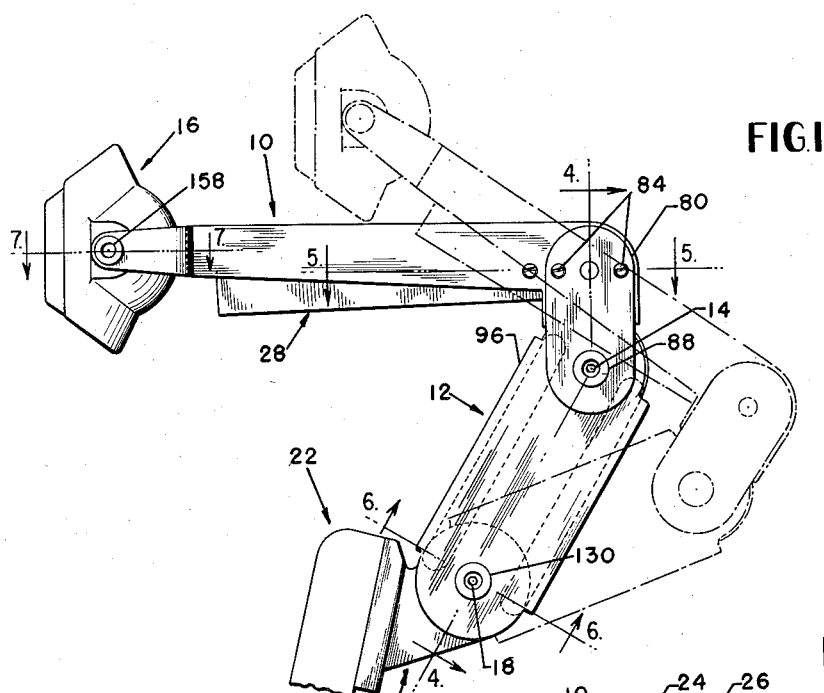
FIG. 1 is an elevational view showing the linkage system in accordance with the present invention as specifically applied to a dental chair or the like and shown to be supporting a head rest therefor.

Referring at this time more particularly to FIG. 1, the linkage system as shown therein comprises an upper link component indicated generally by the reference character 10 and a lower link component indicated generally by the reference character 12, the two such link components being pivotally interconnected about the axis indicated by the reference character 14 in this figure. The upper link component 10 carries, at its free end, remote from the pivotal axis 14, a head rest member indicated generally by the reference character 16 and the details of which form no part of the present invention. The lower link component 12, on the other hand, is pivotally connected about an axis indicated by reference character 18 to a suitable bracket indicated generally by the reference character 20 which is rigidly affixed to the back of a chair shown partially in FIG. 1 and indicated therein by reference character 22 generally. Thus, in accordance with FIG. 1, the present invention is shown specifically adapted to and applied for use in conjunction with a chair such as a chair for dental or ophthalmic purposes, or the like, but it is to be understood that the present invention is equally applicable for many other uses either not specifically shown or described herein of the type wherein an object or article is to be supported from a relatively fixed or rigid base and wherein it is desirable that the movement of the linkage system so supporting the device or article be readily movable by use of one hand and with the linkage system having in association therewith a compound braking mechanism for effecting the rigidifying of the component parts of the linkage system when so desired.

That is to say, the system as shown in FIG. 1 is such that the lower link 12 is independently movable about its pivotal axis 18 and the upper link component 10 is also independently pivotable about its axis 14 to permit movement of the head rest 16 to various and sundry intermediate positions, one of which is shown in dotted lines in FIG. 1. At the same time, it is desirable that whenever the article 16 is established at its desired position, the brake mechanism will be actuated to effectively hold this position and prevent uncontrolled movement therefrom.

Figure 2:
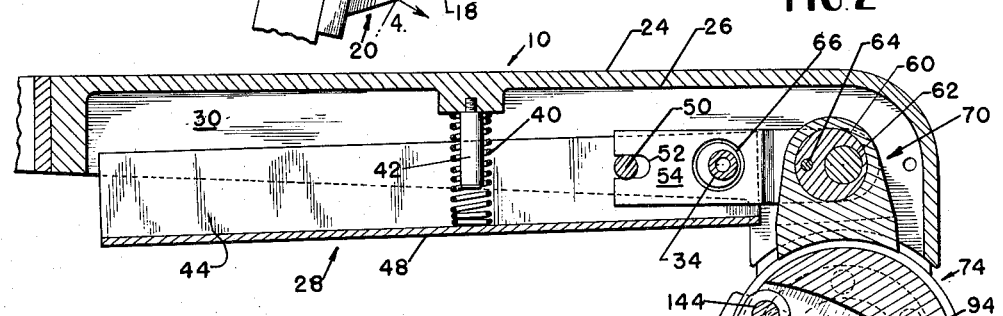
FIG. 2 is an enlarged vertical section taken to the upper pivot connection of the system shown in FIG. 1 and illustrating details of the brake release mechanism associated therewith, the brake mechanism being in the actuated or engaged position therein.

For the particular adaptation as is shown in FIG. 1, the upper linkage component 10 is of L-shape configuration and includes a main body portion 24, see FIG. 2, which is recessed as at 26 at one end to receive the brake release lever 28 between the opposite side walls 30 and 32 provided by such recess. The brake release lever 28 may be of any desired configuration and construction and is pivotally connected adjacent one end thereof between the walls 30 and 32, see particularly FIG. 5. The manner of pivotal interconnection is specifically shown in this figure to be effective by means of an internally threaded bushing 34 which is received by the lever 28 and which bushing is held in place relative to the main body 24 by means of a pair of threaded fasteners 36 and 38 which thus fixedly establish the pivotal axis for the lever 28 as will be readily apparent. To normally urge the brake release lever 28 to the inactive or brake engaging position, a compression spring 40 is provided which is interposed between an intermediate portion of the lever 28 and the body portion 24 of the linkage component 10, see particularly FIG. 2. A limit stop member 42 may be employed in association with the spring 40 substantially as is shown.

In the specific configuration of the lever 28 as is shown in the drawings, the same is of U-shape configuration in cross section presenting the upstanding legs 44 and 46 and the bottom wall 48. Between these legs 44 and 46 is carried an actuating pin 50 which is received within the notches 52 formed in corresponding ends of the brake release arms 54 and 56. These two arms 54 and 56 extend in generally parallel relationship and sandwich therebetween an eccentric disc 60 which is pivotally mounted by means of the pivot pin 62 carried by the main body portion 24 of the upper link component 10. To fix the eccentric disc 60 relative to the brake release arms 54 and 56, a pin or anchor member 64 is utilized, see particularly FIG. 5. Thus, as the arms 54 and 56 are rotated about the axis of the pin 62, they will carry with them the eccentric disc 60, the purpose of which will be presently apparent.

Figure 3:
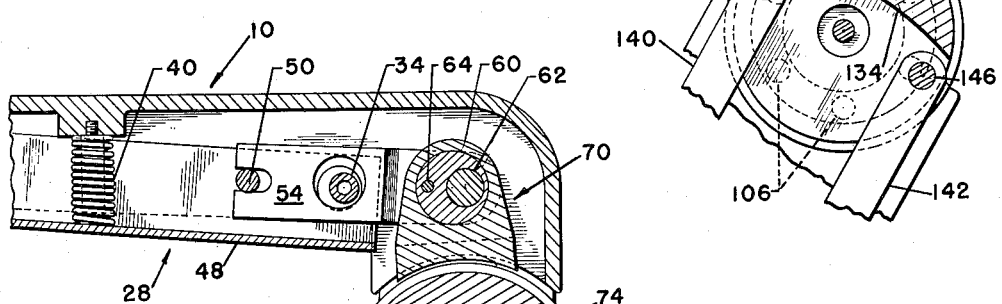
FIG. 3 is a view similar to FIG. 2 but showing the brake mechanism in released position.

The two arms 54 and 56 are disposed to be received between the upstanding legs 44 and 46 of the brake release lever and are provided with oversize openings 66 and 68 to provide clearance for the bushing member 34 previously described. From a study of FIGS. 2 and 3, it will be apparent that since the pivotal axis for the lever 28 is the bushing 34, upward movement of the free end of the brake lever will cause upward movement of the actuating pin 50 and corresponding upward movement of the arms 54 and 56 as is shown between FIGS. 2 and 3. Consequently, a slight clockwise motion of the eccentric disc 60 will be effected, the purpose of which will be hereinafter explained.

The eccentric disc 60 carries a depending brake shoe indicated generally by the reference character 70 in such wise that the eccentric disc is freely rotatable therewithin. The purpose of the eccentric disc 60, it will be readily appreciated, is to effect a vertical motion to the brake shoe 70 which will occur upon clockwise rotation of the eccentric disc as is described above in connection with FIGS. 2 and 3. Thus, when the assemblage is in the position as is shown in FIG. 2, the brake shoe 70 is in its lowermost position, and in that position, will be engaged against a pair of brake drums 72 and 74 to bind against the outer surfaces thereof. When, however, the parts are in the position shown in FIG. 3, the eccentric disc 60 will have raised the brake shoe 70 so that the same is out of contact with the previously mentioned brake drums 72 and 74. In this latter position, the linkage system is free to be moved to a desired position.

Referring at this time more particularly to FIGS. 4 and 5, it can be seen that the end of the body 24 remote from the read rest 16 is provided with a pair of laterally extending cover plates 80 and 82 on opposite sides thereof and which are removably secured thereto as by fasteners 84 and 86. These cover plates extend downwardly generally from the body 24 and establish the pivotal interconnection between the components 10 and 12. This is shown more clearly in FIG. 4 wherein, for this purpose, a pair of internally threaded and headed bushes 88 and 90 are provided which are snugly but rotatably received within suitable alined openings 92 in the cover plates 80 and 82. These bushes also snugly but rotatably receive an internal brake shoe disc 94 carried between the opposite side plates 96 and 98 of the lower link assemblage 12. More accurately, this internal brake shoe or disc 94 is rotatably mounted on the bushes 88 and 90 although it is housed between the side plates 96 and 98, it being important to note that the same is not rigidly associated, pivot-wise, relative thereto. For this purpose, lost motion is deliberately introduced between the side plates 96 and 98 and the bushes 88 and 90, this being indicated by the clearance as shown at 100 and 102 for example. Thus, it will be evident that the side plates 96 and 98 are not directly pivotally connected to the bushes 88 and 90 nor to the cover plates 80 and 82 but that there is permitted a limited amount of lost motion therebetween, as will be established hereinafter.

The brake drums 72 and 74 are rigidly affixed, by rivets or suitable fasteners 104 and 106 to the inner sides of the plates 96 and 98 and have hub portions 108 and 109 projecting therethrough and engaged against the opposed inner surfaces of the cover plates 80 and 82 to present limited areas of localized contact therebetween as opposed to that which would occur were the cover plates 80 and 82 directly in contact with the side plates 96 and 98.

It will be appreciated that the brake drums 72 and 74 are of circular configuration and that their laterally projecting peripheral flanges 110 and 112 provide the inner and outer braking surfaces against which the two shoes 70 and 94 interact.

The pivotal relation between the bracket 20 and the lower end of the lower link assemblage components 12 can be seen most clearly in FIGS. 4 and 6. In these figures, it will be appreciated that the bracket is provided with a boss portion 114 which receives a pair of internally threaded headed bushings 116 and 118 which establishes the internal pivotal connection between the cover plates 96 and 98 and the bracket 20, substantially as shown. In the pivotal interconnection of both the upper and lower ends of the lower link component 12, the internally threaded bushings 88 and 90 as well as the bushings 116 and 118 are provided with their internal threads for the purpose of establishing a spatial adjustment between these members such as to prevent binding of the component parts. For example, in association with the bushings 116 and 118, it will be appreciated that one of them is counterbored as at 120 to receive the headed end 122 of a screwthread fastener 124 which extends therethrough into the other internally threaded bushing 118. A further threaded member 126 is jammed against the free end of the fastener 124 to lock the two bushings 116 and 118 relative to each other so that their heads 130 and 132 will be disposed in predetermined spaced relationship and so as not to bind against the two cover plates 96 and 98 unduly.

To complete the linkage system as is herein described, it will be appreciated that both the brake shoe disc 94 and the boss 114 of the bracket 20 are provided with slots 134 and 136 respectively, to make clearance thereby for the opposite ends of a pair of parallelogram link arms 140 and 142, see especially FIGS. 2, 3, 4 and 6. The upper ends of these link arms 140 and 142 are pivotally connected to the brake disc member 94 by means of the pivot pins 144 and 146 whereas the lower end of these link arms are pivotally connected to the boss 114 of bracket 20 by means of the pivot pins 148 and 150. The purpose of these parallelogram link arms is to effect rotation of the brake shoe disc 94 relatively within the brake drums 72 and 74 when the lower link component 12 is rotated about its axis 18 relative to the fixed bracket 20. This is necessary in order to achieve the compound braking action which will now be described in detail.

As previously mentioned, the spring 40 normally applies sufficient force to the brake release lever 28 to force the same into the position shown in FIG. 2 wherein the brake actuating arms 54 and 56 have been swung counterclockwise to such extent that the brake shoe 70 engages against the outer surface of the brake drum flanges 110 and 112. At the same time, due to this pressing down of the brake shoe against the drums 72 and 74, the entire upper linkage component 10 is tended to be lifted relative to the lower linkage component 12. However, this cannot take place to any degree more than the amount of limited lost motion permitted between the brake shoe disc 94 and the internal surface of the brake drums 72 and 74. For this purpose, it will be apparent that there is a slight amount of clearance, indicated by reference character 152 in FIG. 4 between the brake drums 72 and 74 and the brake disc shoe 94. The pickup of this lost motion is permitted by virtue of the fact that there is lost motion interconnection between the two linkage components 10 and 12 in the region of their pivotal interconnection as has been previously described. Whenever the brake release lever 28 is squeezed by the hand of the operator, and the brake shoe 70 lifted to the position shown in FIG. 3, the upper link component 10 is free to move relative to the lower link component 12. At the same time, and simultaneously with the above action, the inner brake shoe 94 is released from its engagement with the brake drums 72 and 74 so that the lower pivotal connection of the link component 12 is free to move relative to the bracket 20. Thus, it will be readily appreciated that by providing for a limited amount of lost motion interconnection in the pivotal joint between the two linkage components, and providing in conjunction therewith the parallelogram linkage 140, 142 and corresponding portions 114 and 94, a braking action may be achieved between the brake component 94 and the drums 72 and 74 by virtue of the fact that the shoe 94 rotates within the drums 72 and 74 whenever the lower link 12 is moved relative to the bracket 20.

As shown in FIG. 7, although not limiting to the present invention, it will be seen that the forward or free end of the link component 10 may be provided with a yoke assembly 154 which pivotally mounts as at 156 and 158 a head rest mechanism indicated generally by the reference character 160 so that it too is free to pivot for corresponding adjustment whenever the link components 10 and 12 are adjusted.

It will be appreciated that, while only one form of the invention has been shown and described in detail, certain changes and modifications may be made therein without departing from the spirit of the invention or the scope of the appended claims.

I claim:

1. A support arm structure comprising a pair of links having overlapping end portions and a support member for one of said links pivotally connected thereto at that end thereof remote from the other link, fixed brake means attached to said one link, first brake shoe means carried by said other link and movable relative thereto for engaging and disengaging said fixed brake means, second brake shoe means guidably carried by said fixed brake means, means connecting said other link to said second brake shoe means so as to establish pivotal connection between said links, means connecting said second brake shoe means and said support member to effect relative movement between the second brake shoe means and said fixed brake means when said one link is pivoted relative to said support member, and said link being relatively shiftable to permit simultaneous forcible engagement of both said brake shoe means with said fixed brake means in response to engagement of the first brake shoe means with the fixed brake means.

2. The structure according to claim 1 wherein said fixed brake means is a drum assembly, said second brake shoe means being in the form of a disc captive within but rotatable relative to said drum assembly.

3. The structure according to claim 1 including spring means normally urging said first brake shoe means to engage said fixed brake means.

4. A support arm structure comprising a pair of overlapping links and a support member for one of said links, brake drum means fixed to said one link in the region of the overlapping ends of the links, a brake shoe disc rotatably but captively held by said brake drum means, pivot means interconnecting the other link and said brake shoe disc, said one link being pivotally connected to said support member, link means interconnecting said brake shoe disc and said support member for rotating said brake shoe disc within said brake drum means as said one link is pivoted relative to said support member, a brake shoe movably carried by said other link for movement into and out of engagement with said brake drum means, and said pair of links being relatively shiftable to permit simultaneous forcible engagement of both brake shoe members with said brake drum means.

5. A support arm structure comprising a supporting bracket adapted to be attached to a stationary object, a lower link comprising a pair of side plates straddling and pivotally attached to said bracket, an upper link including a pair of side plate portions straddling said side plates of the lower link, pivot means carried between the side plates of said upper link and the side plates of the lower link having enlarged apertures receiving said pivot means, a brake drum fixed to the inner side of each side plate of the lower link in concentric relation to said pivot means and the brake drums including laterally projecting circumferential flanges extending toward each other but terminating in spaced apart relation, a brake shoe disc housed within said brake drums and the diameter of said disc being slightly smaller than the internal diameter of said brake drums so that the disc may rotate within the drums, said brake disc being centrally apertured to snugly receive said pivot means whereby said brake disc is directly connected to said side plates of the upper link, a brake shoe carried between the side plates of said upper link and movable relative thereto so as to move into and out of engagement with the outer surfaces of said brake drum flanges, release means normally urging said brake shoe into engagement with said brake drums, said enlarged apertures in the side plates of said lower link being sufficiently large to permit movement of said pivot means therewithin to engage said brake disc forcibly against the inner surfaces of said flanges when said brake shoe is forced against the outer surfaces thereof, and link means connecting said bracket and said brake shoe disc to rotate the latter relative to said brake drums when said lower link is pivoted relative to said bracket.

6. The structure according to claim 5 wherein said link means is in the form of a parallelogram linkage.

7. The structure according to claim 5 wherein said bracket and said brake shoe disc are provided with slots parallel to said side plates of the lower link and aligned with the spacing between said brake drum flanges, said link means comprising a pair of links having their opposite ends received in said slots and pivotally attached to the bracket and brake shoe disc therewithin.

8. The structure according to claim 5 wherein a pivot pin is carried by said upper link parallel to and spaced from said pivot means, said release means comprising an eccentric journalled on said pivot pin, a pair of release arms received on said pivot pin and straddling said eccentric, said release arms having aligned, enlarged apertures in intermediate portions thereof, a pivot member carried by said upper link and passing freely through the apertures in said release arms, an actuating lever pivotally mounted at one end thereof to said upper link by means of said pivot member, an actuating pin carried by said actuating lever and said release arms being slotted at their ends remote from the eccentric to receive said actuating pin, and said release arms being fixed to said eccentric, said brake shoe being apertured to embrace said eccentric.

9. In a linkage system having at least three elements, one of which is an intermediate link independently pivotally connected adjacent its opposite ends to the other two elements, a compound brake mechanism for simultaneously arresting pivotal movement between both of said other elements and said intermediate link, said compound brake mechanism including drum means fixed to said intermediate link, a brake shoe disc within said drum means, means connecting said disc with one of said other elements for effecting rotation of said disc within the drum means in response to pivotal movement between said intermediate link and said one element, and a brake shoe carried by the other element for movement into and out of engagement with said drum means, said intermediate link and said disc being pivotally interconnected.

10. A linkage system comprising a support member, a first link member pivotally connected to said support member, a second link member, means pivotally joining said link members, said means also providing for limited movement of said link members in directions radial to the pivot axis established by said means, a brake element carried by said first link member, a brake element carried by said support member and positioned adjacent the first link brake element, a brake element carried by said second link member and positioned adjacent the other two brake elements, and means for shifting said first and second links radially of said pivot axis therebetween to forcibly engage all of said brake elements.

11. The system according to claim 10 wherein the brake element carried by said support member is joined thereto by parallelogram linkage means.

12. The system according to claim 10 wherein said brake element of the first link member comprises a drum fixed to said first link member, said brake element of the support member being in the form of disc disposed within said drums.

13. The system according to claim 12 wherein the brake element carried by said support member is joined thereto by parallelogram linkage means.

References Cited in the file of this patent
UNITED STATES PATENTS 684,841    Merker _____ Oct. 22, 1901